United States Patent
Rofougaran

(10) Patent No.: US 7,986,650 B2
(45) Date of Patent: *Jul. 26, 2011

(54) BEAM FORMING AND/OR MIMO RF FRONT-END

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 12/480,209

(22) Filed: Jun. 8, 2009

(65) Prior Publication Data

US 2009/0325515 A1    Dec. 31, 2009

Related U.S. Application Data

(63) Continuation of application No. 11/527,961, filed on Sep. 27, 2006, now Pat. No. 7,619,997.

(51) Int. Cl.
*H04B 7/00* (2006.01)
(52) U.S. Cl. ............................ 370/310.2; 370/338
(58) Field of Classification Search ............... 370/310.2, 370/338
See application file for complete search history.

(56) References Cited

U.S. PATENT DOCUMENTS 7,619,997 B2 * 11/2009 Rofougaran .............. 370/310.2
2007/0210960 A1 * 9/2007 Rofougaran ................. 342/368

* cited by examiner

*Primary Examiner* — Phuc Tran
(74) *Attorney, Agent, or Firm* — Garlick Harrison & Markison; Bruce E. Garlick

(57) ABSTRACT

An RF front-end includes a transmit adjust module, a PA module, an antenna coupling circuit, a LNA module, and a receive adjust module. The transmit adjust module adjusts coordinates of up-converted analog signals when in a first transmit mode and adjusts coordinates of a plurality of up-converted analog signals when in a second transmit mode to produce to produce multiple adjusted up-converted signals and a plurality of adjusted up-converted signals, respectively, which are subsequently amplified by the PA module. The antenna coupling circuit provides the multiple or the plurality of outbound RF signals to at least some of a plurality of antennas depending on the transmit mode and provides multiple or a plurality of inbound RF signals at least some of the plurality of antennas to the LNA module based on a receive mode. The receive adjust module adjusts coordinates of the multiple or plurality of amplified inbound RF signals based on the receive mode.

16 Claims, 13 Drawing Sheets

BEAM FORMING AND/OR MIMO RF FRONT-END

This patent application is claiming priority under 35 USC §120 as a continuing patent application of co-pending patent application entitled Beamforming And/Or MIMO RF Front-End And Applications Thereof, having a filing date of Sep. 27, 2006, and a Ser. No. 11/527,961.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to wireless communication systems and more particularly to radio frequency (RF) transmitters and/or receivers used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g compliant or RFID standard compliant employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beamforming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data. As such, MIMO wireless communication offer the opportunity to transceiver data at higher data rates that single input and/or single output wireless communications. However, when the signal strength of a MIMO wireless communication is weak, the data rate is reduce thereby negating the advantage of a MIMO system.

To provide a directional wireless communication (i.e., increase the signal strength by focusing the energy of a transmitted RF signal in a particular direction), transceivers may incorporate beamforming. In general, beamforming is a baseband processing technique to create a focused antenna beam by shifting a signal in time or in phase to provide gain of the signal in a desired direction and to attenuate the signal in other directions. Prior art papers (1) Digital beamforming basics (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003 discuss beamforming concepts.

In a known beamforming transmitter embodiment, the beamforming transmitter includes the data modulation stage, one or more intermediate frequency (IF) stages, the power amplifier, and a plurality of phase modules. The data modulation stage, the one or more IF stages and the power amplifier operate as discussed above to produce an amplified outbound RF signal. The plurality of phase modules adjust the phase of the amplified outbound RF signal in accordance with a beamforming matrix to produce a plurality of signals that are subsequently transmitted by a set of antennas.

While such a beamforming transmitter provides a functioning transmitter, it requires multiple high frequency and accurate phase modules. Since the phase modules are adjusting the same signal, the resulting magnitude of the phase adjusted signals is the same. Note that gain adjust modules may be added in series with the phase modules, but further adds to the complexity and component count of the beamforming transmitter.

Therefore, a need exists for a radio frequency transceiver that incorporates the benefits of MIMO and/or beamforming, but does so in such a way as to substantially overcome one or more of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
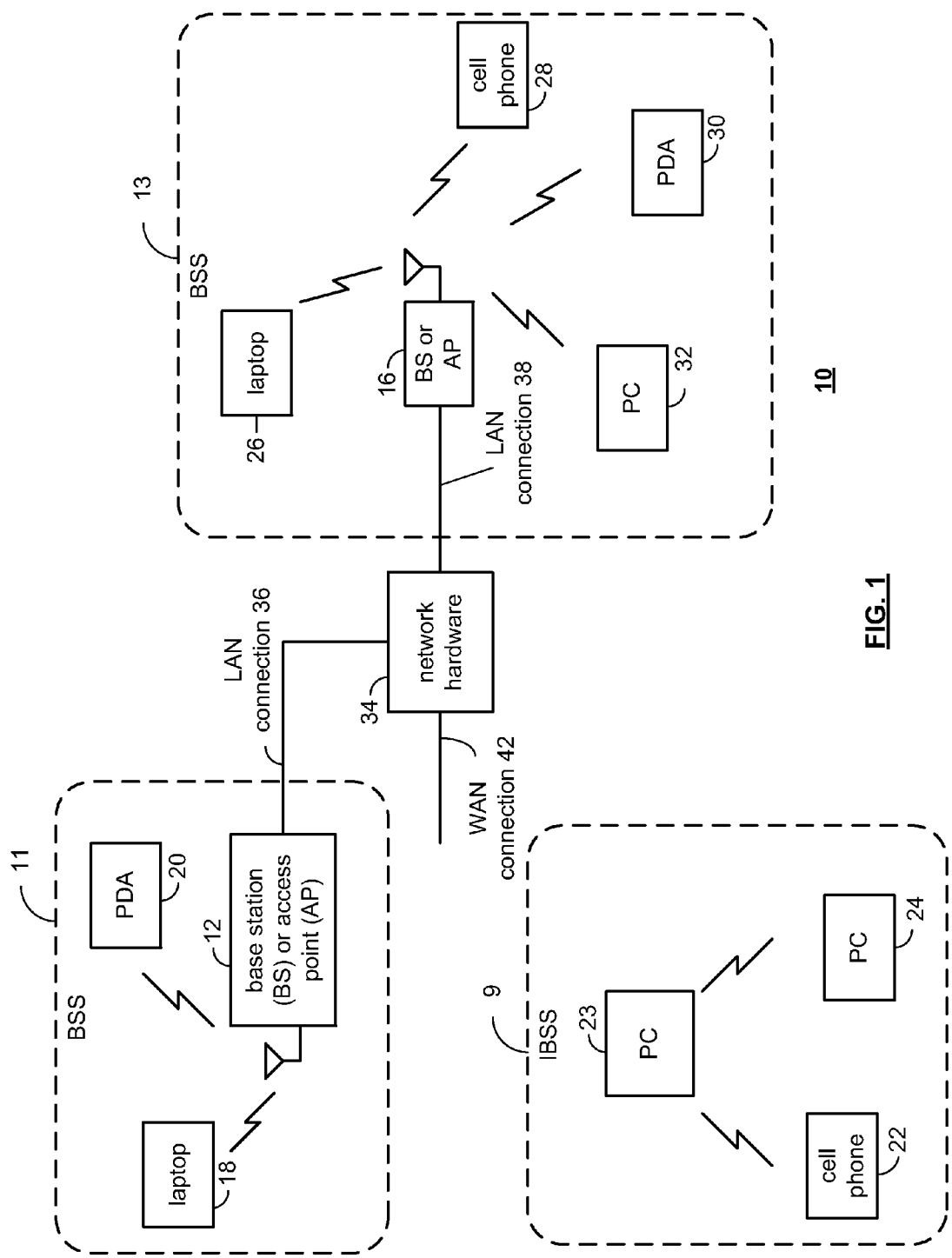
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to one ore more of FIGS. 2-13.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
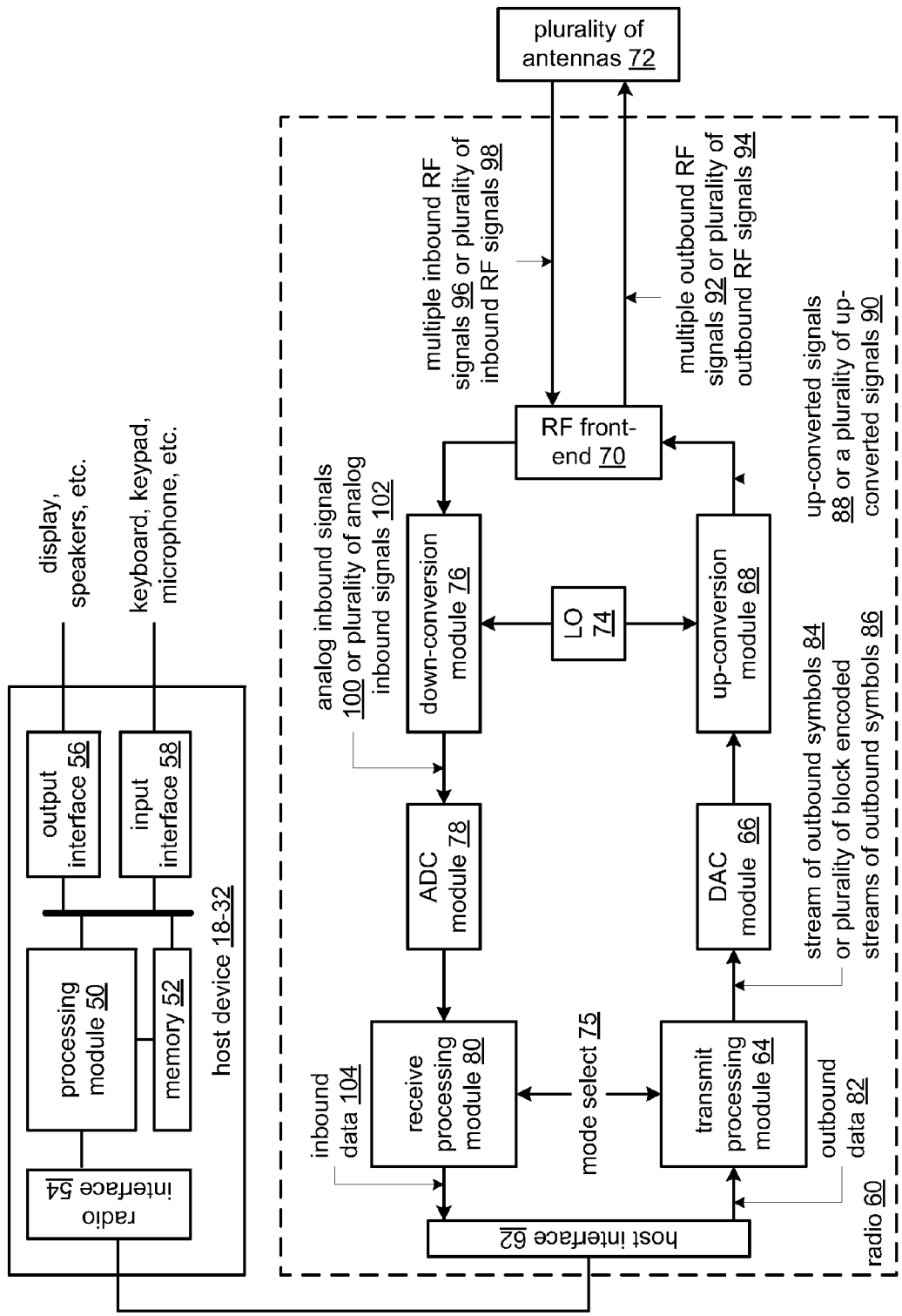
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, RFID reader hosts, walkie-talkie hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

The radio 60 includes a host interface 62, a transmit processing module 64, a digital to analog conversion (DAC) module 66, an up-conversion module 68, an RF front-end 70 coupled to a plurality of antennas 72, a down-conversion module 76, an analog-to-digital conversion (ADC) module 78, and a receive processing module 80. The receive and transmit processing modules 80 and 64 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. In addition, the processing module 64 and 80 may include memory, which may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 80 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 82 from the host device via the host interface 62. The host interface 62 routes the outbound data 82 to the transmit processing module 64. In a first transmit mode (e.g., RF beamform a single outbound RF signal), the transmit processing module 64 convert outbound data 82 into a stream of outbound symbols 84 when the RF transceiver. The conversion, which may be in accordance with a particular wireless communication standard (e.g., IEEE 802.11, Bluetooth, RFID, CDMA, GSM, et cetera), includes one or more of scrambling, encoding, constellation mapping, modulation, and/or digital baseband to IF conversion. Note the stream of outbound symbols 84 may be at baseband (e.g., have a zero intermediate frequency (IF)) or at a low IF of one hundred kilohertz to a few megahertz.

In a second transmit mode (e.g., MIMO), the transmit processing module 64 converts the outbound data 82 into a plurality of block encoded streams of outbound symbols 86. In one embodiment, the transmit processing module 64 converts the outbound data 82 into the plurality of block encoded streams of outbound symbols 86 by encoding the outbound data 82 into outbound encoded data. The transmit processing module 64 then interleaves the outbound encoded data into a plurality of streams of interleaved outbound data. The transmit processing module 64 then maps each of the plurality of streams of interleaved outbound data into a plurality of outbound symbol streams. The transmit processing module 64 then block encodes (e.g., space time block encoding and/or frequency time block encoding) each of the plurality of outbound symbol streams in space or in frequency to produce a plurality of outbound blocked encoded symbol streams. The transmit processing module 64 then transforms domain of each of the plurality of outbound block encoded symbol streams from the frequency domain to the time domain to produce the plurality of block encoded streams of outbound symbols 86.

The digital to analog conversion (DAC) module 66, which includes one or more digital to analog converters, converts the stream of outbound symbols into analog signals when the RF transceiver is in the first transmit mode (e.g., RF beamforming). Note that if the stream of outbound symbols includes an in-phase component and a quadrature component, the DAC module 66 uses two digital to analog converters (i.e., one for the in-phase component and a second for the quadrature component) to produce the analog signals. When the RF transceiver is in the second transmit mode (e.g., MIMO), the DAC module 66 converts the plurality of block encoded streams of outbound symbols into a plurality of analog signals. Note that if each block encoded stream of outbound symbols includes an in-phase component and a quadrature component, the DAC module 66 uses two digital to analog converters (i.e., one for the in-phase component and a second for the quadrature component) for each block encoded stream. Thus, if there are four block encoded streams of outbound symbols 86, then the DAC module includes eight digital to analog converters.

The up-conversion module 68 converts the analog signals into up-converted signals 88 when the RF transceiver is in the first transmit mode and converts the plurality of analog signals into a plurality of up-converted signals 90 when the RF transceiver is in the second transmit mode. In one embodiment, the up-conversion module 68 converts the analog signals into up-converted signals 88 by mixing the analog signals with a local oscillation provided by the local oscillation (LO) module 74. This may be done directly (e.g., the local oscillation is approximately equal to the carrier frequency of the outbound RF signals) or in a superheterodyne manner using two or more intermediate frequency stages. In an embodiment, the up-conversion module 68 converts the plurality of analog signals into the plurality of up-converted signals 90 by mixing each of the plurality of analog signals with the local oscillation provided by the local oscillation (LO) module 74. This may be done directly (e.g., the local oscillation is approximately equal to the carrier frequency of the outbound RF signals) or in a superheterodyne manner using two or more intermediate frequency stages.

The RF front-end 70, which will be described in greater detail with reference to one or more of FIGS. 7-13, adjust coordinates (e.g., one or more of phase, frequency, and amplitude) of the up-converted signals 88 when the RF transceiver is in the first transmit mode to produce multiple adjusted up-converted signals. The RF front-end 70 then amplifies the multiple adjusted up-converted signals to produce multiple outbound RF signals 92. The RF front-end 70 provides the multiple outbound RF signals 92 to at least some of a plurality of antennas 72. In one embodiment, the plurality of antennas 72 includes a set of transmit antennas and a set of receive antennas such that the RF transceiver may operate in a full duplex mode with the transmit path using one frequency band and the receive path using another frequency band. Thus, in this embodiment, the at least some of the plurality antennas 72 corresponds to the set of transmit antennas.

In another embodiment, the RF transceiver operates in a half duplex mode where the transmit and receive paths share the plurality of antennas 72. In this instance, the at least some of the plurality antennas 72 may include all of the antennas 72 or some of the antennas 72 depending on the number of antennas and the desired beamforming. For example, if there are four antennas in the plurality of antennas, each with a different polarization, then four outbound RF signals 92 may be generated, thus using all four antennas. Alternatively, only two outbound RF signals 92 may be generated, thus only two of the four antennas would be used.

When the RF transceiver is in the second transmit mode, the RF front-end 70 adjusts coordinates (e.g., one or more of phase, frequency, and amplitude) of the plurality of up-converted analog signals to produce a plurality of adjusted up-converted signals. The RF front-end 70 then amplifies the plurality of adjusted up-converted signals to produce a plurality of outbound RF signals 94. The RF front-end 70 then provides the plurality of outbound RF signals 94 to the at least some of the plurality of antennas 72.

When the RF transceiver is in a first receive mode (e.g., RF beamforming), the RF front-end receives multiple inbound RF signals 96 from another at least some of the plurality of antennas 72. Note that the another at least some of the plurality of antennas 72 may correspond to a set of receive antennas of the plurality of antennas 72 such that the RF transceiver may operate in a full duplex mode with the transmit path using one frequency band and the receive path using another frequency band.

The RF front-end 70 then amplifies the multiple inbound RF signals 96 to produce multiple amplified inbound RF signals. The RF front-end 70 then adjusts coordinates (e.g., one or more of phase, frequency, and amplitude) of the multiple amplified inbound RF signals 96 to produce adjusted inbound RF signals.

When the RF transceiver is in a second receive mode (e.g., MIMO), the RF front-end receives a plurality of inbound RF signals 98 from the another at least some of the plurality of antennas 72. The RF front-end then amplifies the plurality of inbound RF signals 98 to produce a plurality of amplified inbound RF signals. The RF front-end 70 then adjusts coordinates (e.g., one or more of phase, frequency, and amplitude) of the plurality of amplified inbound RF signals to produce a plurality of adjusted inbound RF signals.

The down-conversion module 78 converts the adjusted inbound RF signals 96 into analog inbound signals 100 when the RF transceiver is in the first receive mode (e.g., RF beamforming) and converts the plurality of adjusted inbound RF signals 98 into a plurality of analog inbound signals 102 when the RF transceiver is in the second receive mode (e.g., MIMO). In one embodiment, the down-conversion module 76 converts the adjusted inbound RF signals 96 into analog inbound signals 100 by mixing the adjusted inbound RF signals 96 with a local oscillation provided by the local oscillation (LO) module 74. This may be done directly (e.g., the local oscillation is approximately equal to the carrier frequency of the inbound RF signals) or in a superheterodyne manner using two or more intermediate frequency stages. In an embodiment, the down-conversion module 76 converts the plurality of adjusted inbound RF signals 98 into a plurality of analog inbound signals 102 by mixing each of the plurality of adjusted inbound RF signals 98 with the local oscillation provided by the local oscillation (LO) module 74. This may be done directly (e.g., the local oscillation is approximately equal to the carrier frequency of the outbound RF signals) or in a superheterodyne manner using two or more intermediate frequency stages.

The analog to digital conversion (ADC) module 78 converts the analog inbound signals 100 into a stream of inbound symbols when the RF transceiver is in the first receive mode (e.g., RF beamforming) and convert the plurality of analog inbound signals 102 into a plurality of streams of inbound block encoded symbols when the RF transceiver is in the second receive mode (e.g., MIMO). Note that if the analog inbound signals 100 includes an in-phase component and a quadrature component, the ADC module 78 uses two analog to digital converters (i.e., one for the in-phase component and a second for the quadrature component) to produce the stream of inbound symbols. Further note that if each of the plurality of analog inbound signals 102 includes an in-phase component and a quadrature component, the ADC module 78 uses two analog to digital converters (i.e., one for the in-phase component and a second for the quadrature component) for each analog inbound signals. Thus, if there are four analog inbound signals 102, then the ADC module 78 would include eight analog to digital converters.

The receive processing module 80 convert the stream of inbound symbols into inbound data 104 when the RF transceiver is in the first receive mode (e.g., RF beamforming) and converts the plurality of streams of inbound block encoded symbols into the inbound data 104 when the RF transceiver is in the second receive mode (e.g., MIMO). In one embodiment, the conversion, which may be in accordance with a particular wireless communication standard (e.g., IEEE 802.11, Bluetooth, RFID, CDMA, GSM, et cetera), includes one or more of digital intermediate frequency to baseband conversion, demodulation, constellation demapping, decoding, and/or descrambling. Note the stream of inbound symbols may be at baseband (e.g., have a zero intermediate frequency (IF)) or at a low IF of one hundred kilohertz to a few megahertz.

In another embodiment, the conversion may include a space/time and/or frequency/time decoding to produce M-output paths from P-inputs from the receiver. The M-output paths are converted from a time domain to a frequency domain to produce frequency domain symbols. The receive processing module 80 then demaps the frequency domain symbols into demapped symbol streams. The demapped symbol streams are combined into a single path and then deinterleaved to produce deinterleaved data. The receive processing module 80 then decodes the deinterleaved data to produce the inbound data 104.

Figure 3:
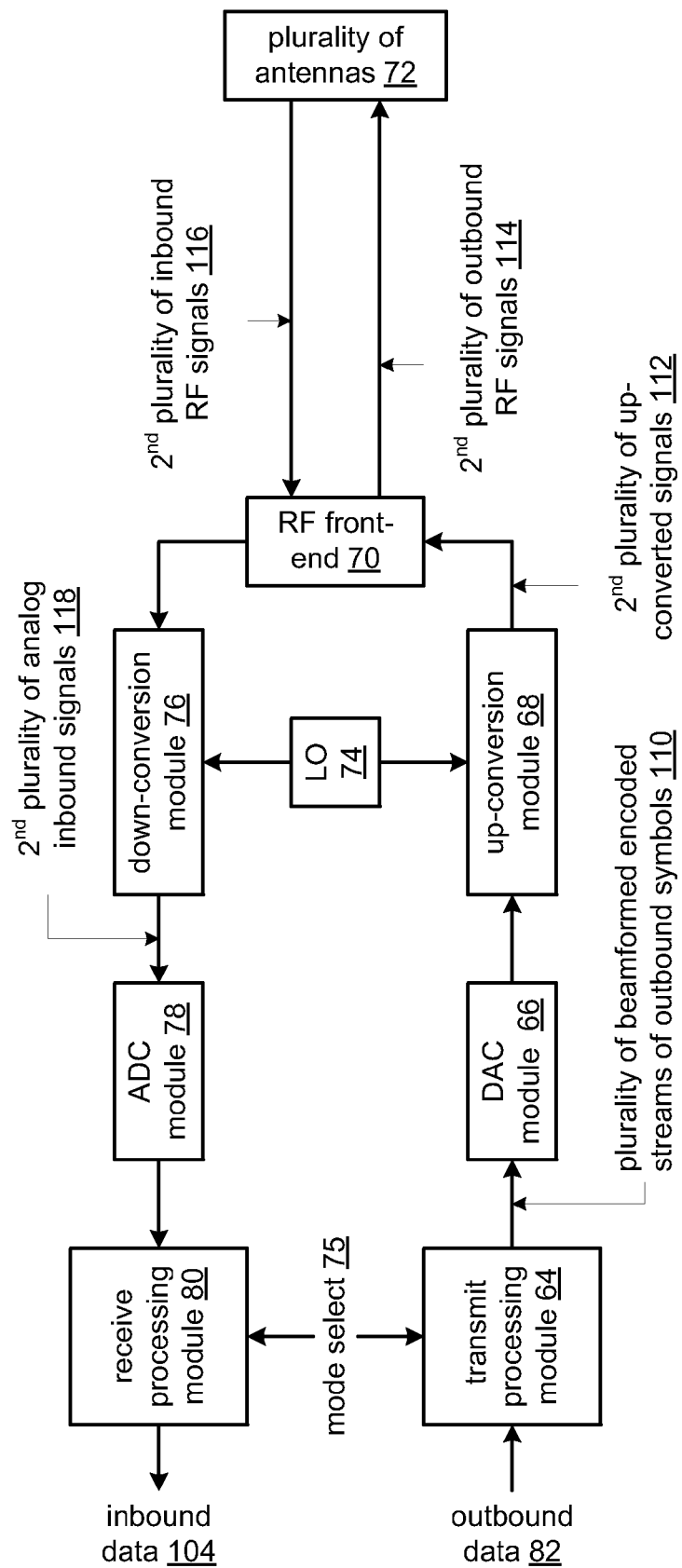
FIG. 3 is a schematic block diagram of an embodiment of a radio frequency (RF) transceiver in accordance with the present invention.

FIG. 3 is a schematic block diagram of an embodiment of a radio frequency (RF) transceiver in a third transmit and receive mode. In this embodiment, the transmit baseband processing module 64 converts the outbound data 64 into a plurality of beamformed streams of outbound symbols 110 when the RF transceiver is in a third transmit mode. In this embodiment, the transmit processing module 64 converts the outbound data 82 into the plurality of beamformed streams of outbound symbols 110 by encoding the outbound data 82 into outbound encoded data. The transmit processing module 64 then interleaves the outbound encoded data into a plurality of streams of interleaved outbound data. The transmit processing module 64 then maps each of the plurality of streams of interleaved outbound data into a plurality of outbound symbol streams. The transmit processing module 64 then multiples the plurality of outbound symbol streams with a beamforming matrix to produce a plurality of outbound beamformed encoded symbol streams. The transmit processing module 64 then transforms domain of each of the plurality of outbound beamformed encoded symbol streams from the frequency domain to the time domain to produce the plurality of beamformed streams of outbound symbols 110.

The digital to analog conversion module 66 converts the plurality of beamformed streams of outbound symbols 110 into a second plurality of analog signals. The up-conversion module 68 converts the second plurality of analog signals into a second plurality of up-converted signals 112.

The RF front end 70 adjusts coordinates of the second plurality of up-converted analog signals 112 to produce a second plurality of adjusted up-converted signals, which are both baseband and RF beamformed. The RF front-end 70 then amplifies the second plurality of adjusted up-converted signals to produce a second plurality of outbound RF signals 114. The RF front-end 70 then provides the second plurality of outbound RF signals 114 to the at least some of the plurality of antennas 72.

When the RF transceiver is in the third receive mode, the RF front-end receives a second plurality of inbound RF signals 116 from the another at least some of the plurality of antennas. The RF front-end 70 then amplifies the second plurality of inbound RF signals 116 to produce a second plurality of amplified inbound RF signals. The RF front-end 70 then adjusts coordinates of the second plurality of amplified inbound RF signals 116 to produce a second plurality of adjusted inbound RF signals, which now are only baseband beamformed.

The down-conversion module 76 converts the second plurality of adjusted inbound RF signals into a second plurality of analog inbound signals 118. The analog to digital conversion module 78 convert the second plurality of analog inbound signals 118 into a plurality of streams of inbound beamformed symbols. The receive baseband processing module 80 converts the plurality of streams of inbound beamformed symbols into the inbound data 80 using an inverse process of the transmit processing module 64.

Figure 4:
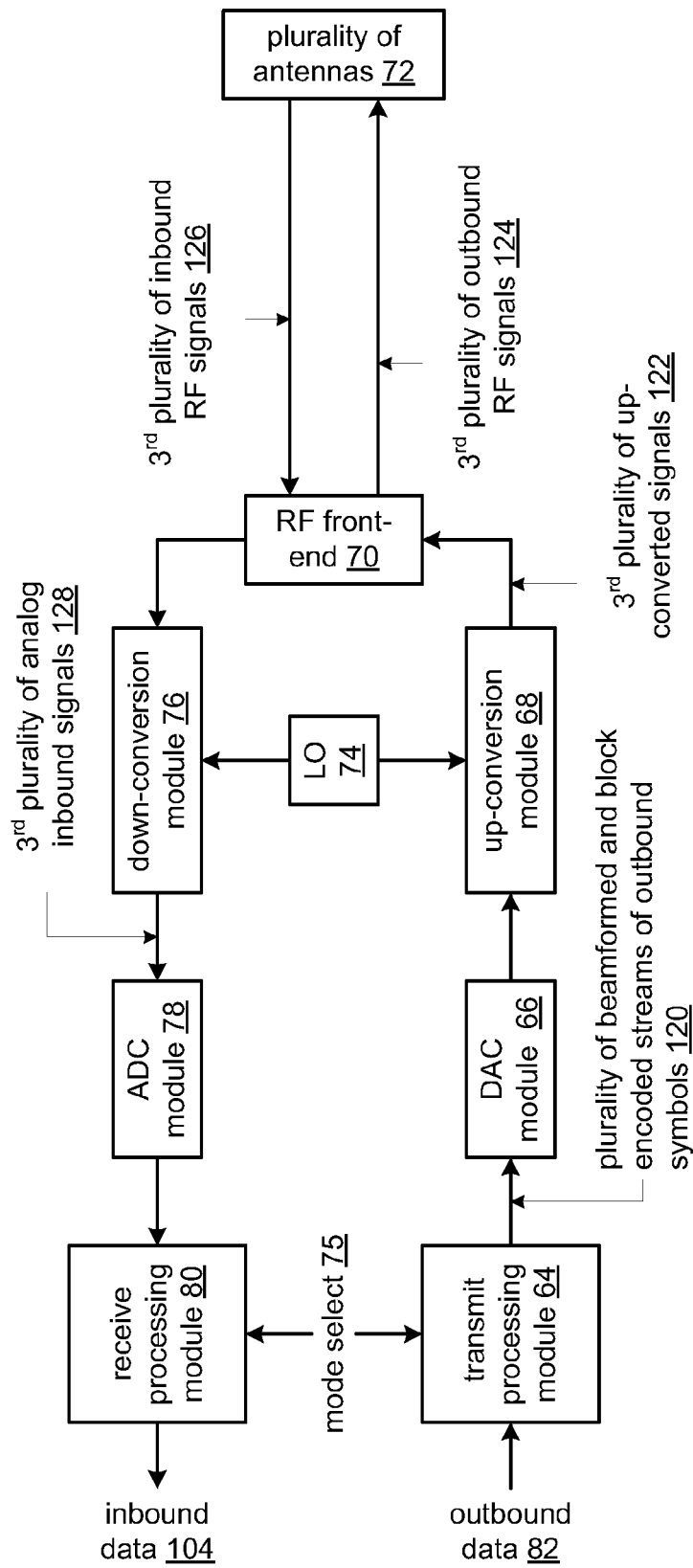
FIG. 4 is a schematic block diagram of another embodiment of an RF transceiver in accordance with the present invention.

FIG. 4 is a schematic block diagram of another embodiment of an RF transceiver in a fourth transmit and receive mode (e.g., MIMO with baseband and RF beamforming). In this embodiment, the transmit baseband processing module 64 converts the outbound data 82 into a plurality of beamformed and block encoded streams of outbound symbols 120, which may be done by a combination of the processing described with reference to FIGS. 2 and 3.

The digital to analog conversion module 66 converts the plurality of beamformed and block encoded streams of outbound symbols 120 into a third plurality of analog signals. The up-conversion module 68 converts the third plurality of analog signals into a third plurality of up-converted signals 122.

The RF front-end 70 adjusts coordinates of the third plurality of up-converted analog signals 122 to produce a third plurality of adjusted up-converted signals. The RF front-end 70 amplifies the third plurality of adjusted up-converted signals to produce a third plurality of outbound RF signals 124. The RF front-end 70 then provides the third plurality of outbound RF signals 124 to the at least some of the plurality of antennas 72.

When the RF transceiver is in the fourth receive mode, the RF front-end 70 receives a third plurality of inbound RF signals 126 from the another at least some of the plurality of antennas 72. The RF front-end 70 then amplifies the third plurality of inbound RF signals 126 to produce a third plurality of amplified inbound RF signals. The RF front-end 70 then adjusts coordinates of the third plurality of amplified inbound RF signals to produce a third plurality of adjusted inbound RF signals.

The down-conversion module 76 converts the third plurality of adjusted inbound RF signals into a third plurality of analog inbound signals 126. The analog to digital conversion module 78 converts the third plurality of analog inbound signals 128 into a plurality of streams of inbound beamformed and block encoded symbols. The receive baseband processing module 80 converts the plurality of streams of inbound beamformed and block encoded symbols into the inbound data 104.

Figure 5:
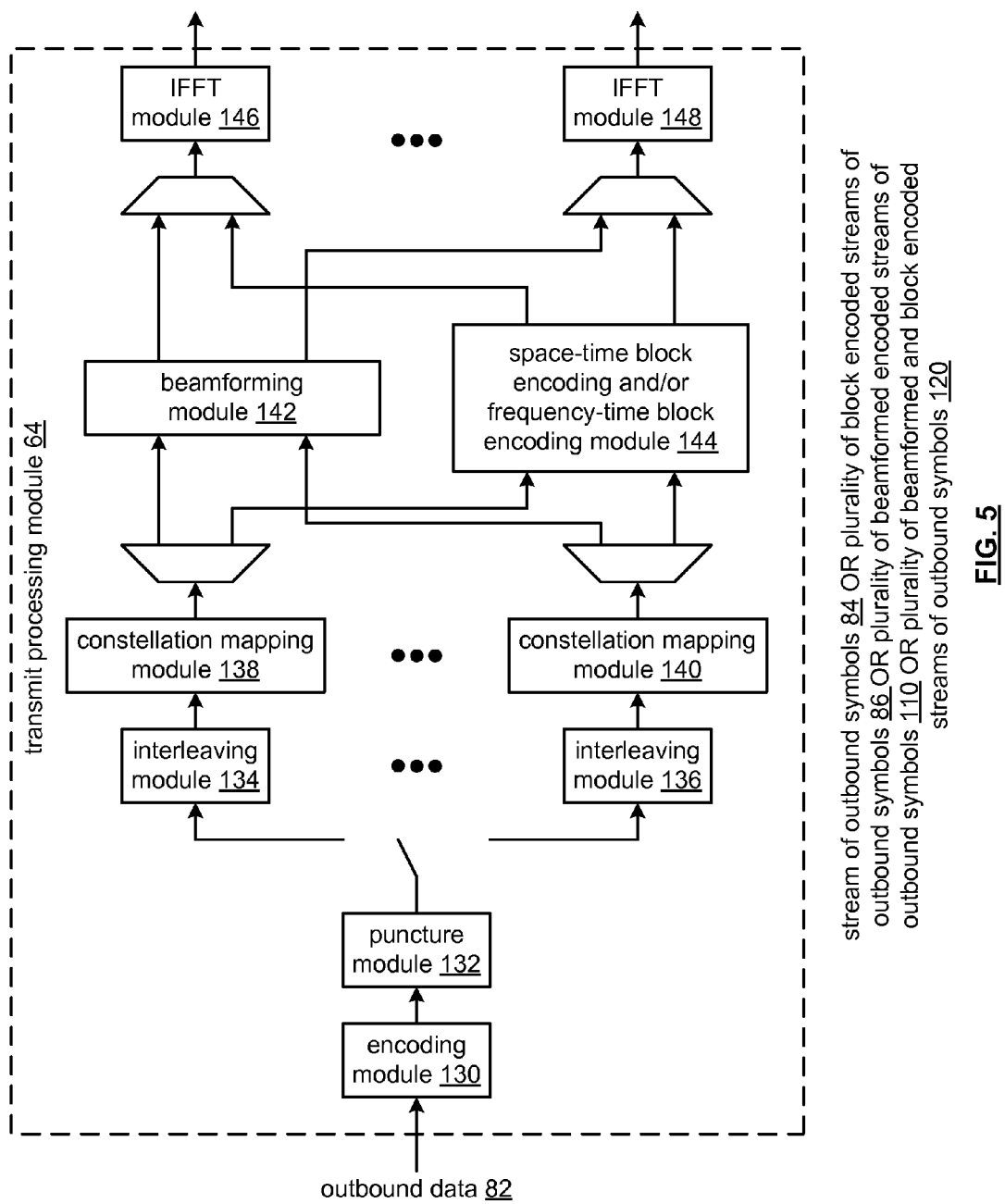
FIG. 5 is a schematic block diagram of an embodiment of a transmit processing module in accordance with the present invention.

FIG. 5 is a schematic block diagram of an embodiment of a transmit processing module 64 that includes functional blocks of an encoding module 130, a puncture module 132, a switch, a plurality of interleaving modules 134, 136, a plurality of constellation mapping modules 138-140, a space-time and/or space-frequency block encoding module 144, a beamforming module 142, a plurality of inverse fast Fourier transform (IFFT) modules 146-148, and a plurality of multiplexers. As one of ordinary skill in the art will appreciate, the transmit processing module 64 may include two or more of each of the interleaving modules 134-136, the constellation mapping modules 138-140, and the IFFT modules 146-148 depending on the number of transmit paths to be generated. In addition, one of ordinary skill in art will appreciate that the encoding module 130, puncture module 132, the interleaving modules 134-136, the constellation mapping modules 138-140, and the IFFT modules 146-148 may function in accordance with one or more wireless communication standards including, but not limited to, IEEE 802.11a, b, g, n.

In one embodiment, the encoding module 130 is coupled to convert outbound data 82 into encoded data in accordance with one or more wireless communication standards. The puncture module 132 punctures the encoded data to produce punctured encoded data. The plurality of interleaving modules 134-136 is coupled to interleave the punctured encoded data into a plurality of interleaved streams of data. The plurality of constellation mapping modules 138-140 is coupled to map the plurality of interleaved streams of data into a plurality of streams of data symbols, wherein each data symbol of the stream of data symbols includes one or more complex signal. The plurality of streams of data symbols may now be space-time of frequency block encoded and/or baseband beamformed. For example, if the plurality of streams of data symbols is to be both block encoded and baseband beamformed, the streams may be first block encoded and then beamformed by gating the multiplexers in the appropriate manner. As another example, if the streams are to be only block encoded (e.g., the RF transceiver is in the MIMO mode), the multiplexers provide the streams to and from the encoding module 144.

If the space-time and/or space-frequency block encoding module 144 is used, it encodes a plurality of complex signals (e.g., at least two complex signals) into a plurality of space-time and/or space-frequency block encoded signals. The plurality of IFFT modules 146-148 converts the plurality of space-time and/or space-frequency block encoded signals into a plurality of outbound symbol streams 86, 110, and/or 120. Note that if only RF beamforming is to be used, only one path through the transmit processing module is enabled to produce the stream of outbound symbols 84.

Figure 6:
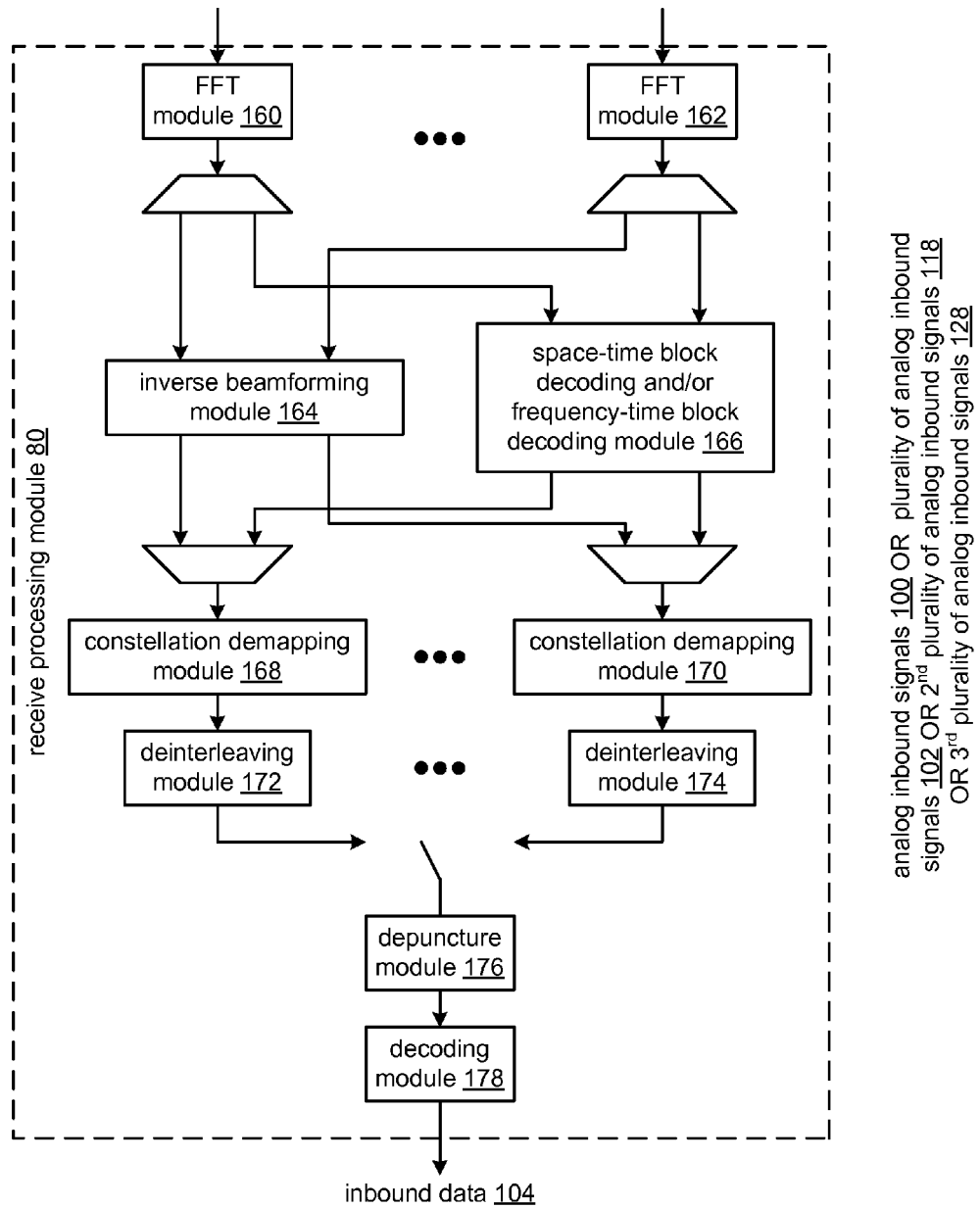
FIG. 6 is a schematic block diagram of an embodiment of a receive processing module in accordance with the present invention.

FIG. 6 is a schematic block diagram of an embodiment of the processing module 80 that includes functional blocks of a plurality of fast Fourier transform (FFT) modules 160-162, a space-time and/or space-frequency block decoding module 166, an inverse beamforming module 164, multiplexers, a plurality of constellation demapping modules 168-170, a plurality of deinterleaving modules 172-174, a switch, a depuncture module 176, and a decoding module 178 for converting a plurality of inbound symbol streams 102, 118, or 128 into inbound data 104. As one of ordinary skill in the art will appreciate, the receive processing module 80 may include two or more of each of the deinterleaving modules 172-174, the constellation demapping modules 168-170, and the FFT modules 160-162. In addition, one of ordinary skill in art will appreciate that the decoding module 178, the depuncture module 176, the deinterleaving modules 172-174, the constellation decoding modules 168-170, and the FFT modules 160-162 may be function in accordance with one or more wireless communication standards including, but not limited to, IEEE 802.11a, b, g, n.

In one embodiment, the plurality of FFT modules 160-162 converts a plurality of inbound symbol streams 102, 118, or 128 into a plurality of streams of space-time and/or space-frequency block encoded symbols and/or beamformed encoded symbols. If the symbols are block encoded, the space-time and/or space-frequency block decoding module 166 decodes the plurality of streams of space-time and/or space-frequency block encoded symbols into a plurality of streams of data symbols. If the symbols are also beamformed, or in the alternative, are only beamformed, the inverse beamforming module 164 generates the plurality of streams of data symbols.

The plurality of constellation demapping modules 168-170 demaps the plurality of streams of data symbols into a plurality of interleaved streams of data. The plurality of deinterleaving modules 172-174 deinterleaves the plurality of interleaved streams of data into encoded data. The decoding module 178 converts the encoded data into inbound data 104.

Figure 7:
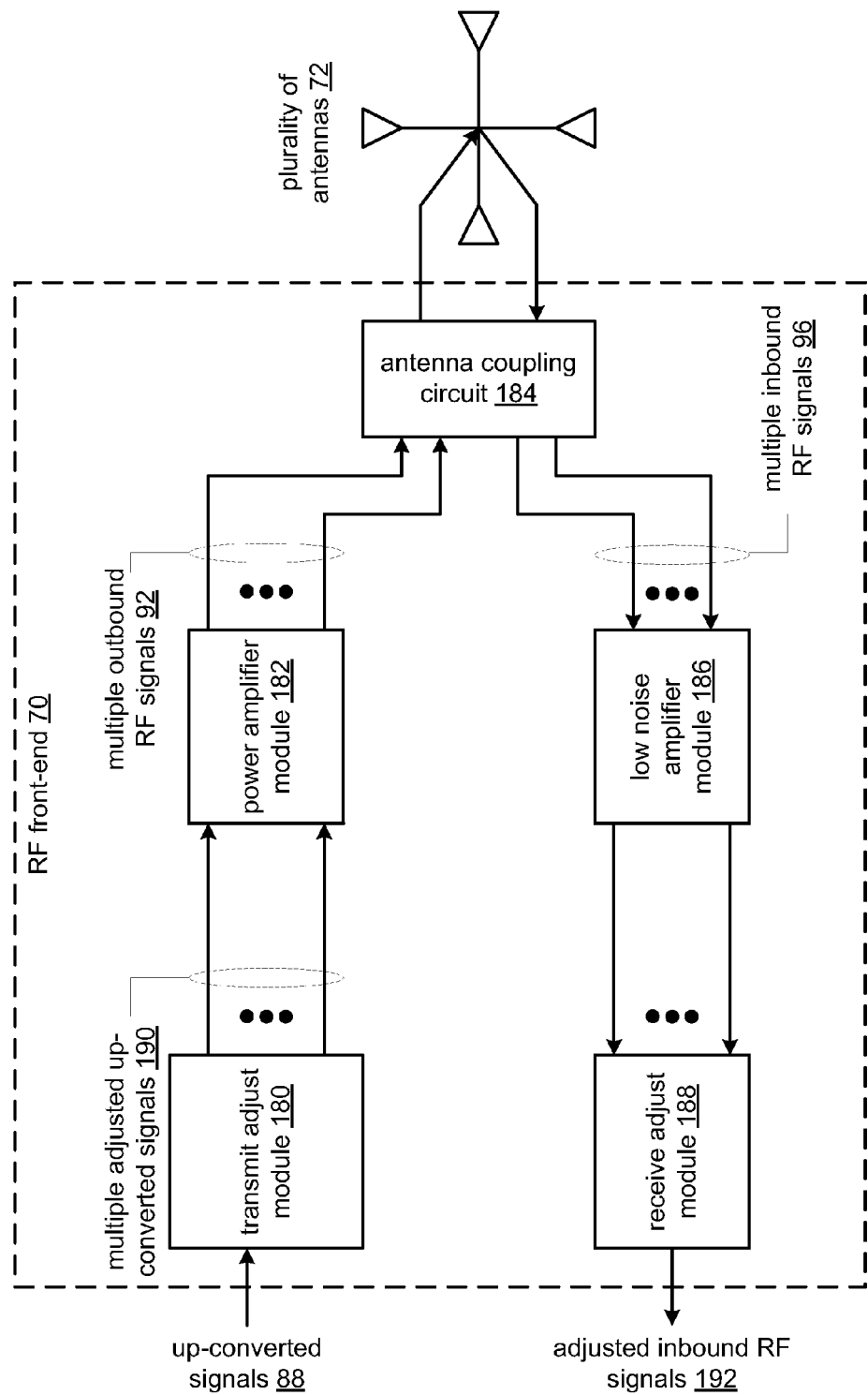
FIG. 7 is a schematic block diagram of an embodiment of an RF front-end in accordance with the present invention.

FIG. 7 is a schematic block diagram of an embodiment of the RF front-end 70 that includes a transmit adjust module 180, a power amplifier module 182, an antenna coupling circuit 184, a low noise amplifier module 186, and a receive adjust module 188. As shown, the RF front-end 70 is coupled to the plurality of antennas 72. The plurality of antennas 72 may include two or more antennas having the same or different polarization and/or may include a diversity structure.

The transmit adjust module 180, which will be described in greater detail with reference to one or more of FIGS. 8-13, adjusts coordinates of the up-converted analog signals 88 when the RF transceiver is in the first transmit mode to produce multiple adjusted up-converted signals 190. The power amplifier module 182, which may include one or more power amplifiers, pre-amplifiers, RF bandpass filters, and gain control, amplifies the multiple adjusted up-converted signals 190 when the RF transceiver is in the first transmit mode to produce multiple outbound RF signals 92.

The antenna coupling circuit 184 provides the multiple outbound RF signals 92 to at least some of a plurality of antennas 72 when the RF transceiver is in the first transmit mode. The antenna coupling circuit 184 also provides the multiple inbound RF signals 96 from another at least some of the plurality of antennas 72 to the low noise amplifier module 186 when the RF transceiver is in a first receive mode.

The low noise amplifier module 186, which may include one or more amplifiers, amplifies the multiple inbound RF signals 96 to produce multiple amplified inbound RF signals when the RF transceiver is in the first receive mode. The receive adjust module 188 adjusts coordinates of the multiple amplified inbound RF signals when the RF transceiver is in the first receive mode to produce adjusted inbound RF signals 192. In one embodiment, the transmit adjust module, the power amplifier module, the antenna coupling circuit, the low noise amplifier module, and the receive adjust module located on a common die of an integrated circuit.

Figure 8:
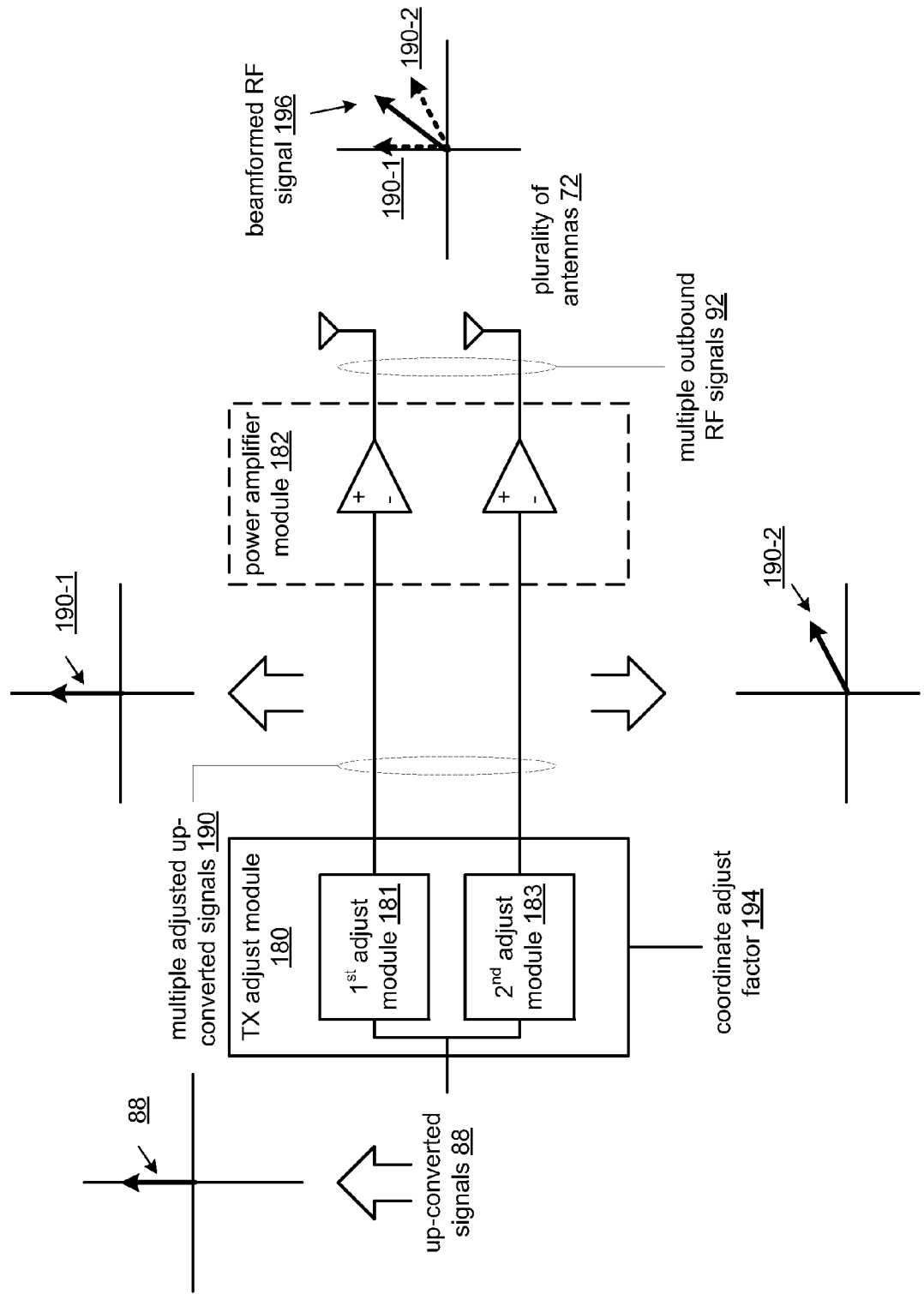
FIG. 8 is a schematic block diagram of an embodiment of a transmit adjust module and a power amplifier module in accordance with the present invention.

FIG. 8 is a schematic block diagram of an embodiment of the transmit adjust module 180 and the power amplifier module 182 when the RF transmitter is in the first transmit mode (e.g., RF beamforming). The transmit adjust module 180 includes first and second adjust modules 181 and 183 and the power amplifier module 182 includes first and second power amplifiers. In one embodiment, the transmit adjust module 180 receives the up-converted signals 88, which may be a sinusoidal signal or complex signal having an in-phase component and a quadrature component. For this example, the up-converted signals 88 are a cosine waveform, which is illustrated as a vector having coordinates of an amplitude (e.g., the length of the arrow) and a phase shift of 90°. As one of ordinary skill in the art will appreciate, the coordinates of the outbound RF signal 90 may be polar coordinates or Cartesian coordinates.

The transmit adjust module 180 adjusts the phase and/or amplitude of the up-converted signals 88, via the first and second adjust modules 181 and 183 based on a coordinate adjust factor 194. The coordinate adjust factor 194 is determined based on the number of antennas, the polarization of the antennas, and/or the desired transmission vector. In this example, there are two antennas of the plurality of antennas 72, each having the same polarization. The desired transmission vector has an angle of approximately 60°, thus the coordinate adjust factor 194 indicates that two adjusted up-converted signals 190 are to be generated from the up-converted signal 88. The first adjust module 181 generates a $1^{st}$ of the two adjusted up-converted signals 190 with a zero phase adjust and a zero amplitude adjustment of the up-converted signals 88. As such, the $1^{st}$ of the two adjusted up-converted signals 190 is a replica of the up-converted signals 88.

The second adjust module 183 generates a $2^{nd}$ of the two adjusted up-converted signals 190 with a −60° phase adjust and a zero amplitude adjustment of the up-converted signals 88. As such, the $2^{nd}$ of the two adjusted up-converted signals 190 is shown as a vector having the same amplitude as the up-converted signals 88 with a −60° degree phase shift the up-converted signals 88. As one of ordinary skill in the art will appreciate, the TX adjust module 180 may produce more than two RF signal components depending on the desired beamformed signal and the transmit circuitry available.

The power amplifiers of the power amplifier module 182 amplify the two adjusted up-converted signals 190 to produce amplified RF signal components. The power amplifiers may have their gains adjusted in accordance with the coordinate adjust factor 194 to further adjust the corresponding RF signal component. In this example, the gains of the power amplifiers is the same, thus with respect to each other, the magnitudes of the amplified RF signal components is the same.

The antennas 72 transmit the corresponding amplified RF signal components 190-1 and 190-2 to produce a beamformed RF signal 196. The beamforming of the beamformed RF signal 196 is done in air based on a vector summation of the amplified RF signal components 190-1 and 190-2. As shown, the beamformed RF signal 196 has an amplitude and a phase that corresponds to the vector summation of RF signal components 190-1 and 190-2. Note that by adjusting the phase of the RF signal components 190-1 and 190-2 and/or the amplitudes of the RF signal components 190-1 and 190-2, the beamformed RF signal 196 may be generated having a desired magnitude with a desired phase shift. As such, regardless of the direction of the targeted receiver with respect to the transmitter, the beamformed RF signal 196 may be produced to provide a maximum amount of energy transmitted in the direction of the receiver.

Figure 9:
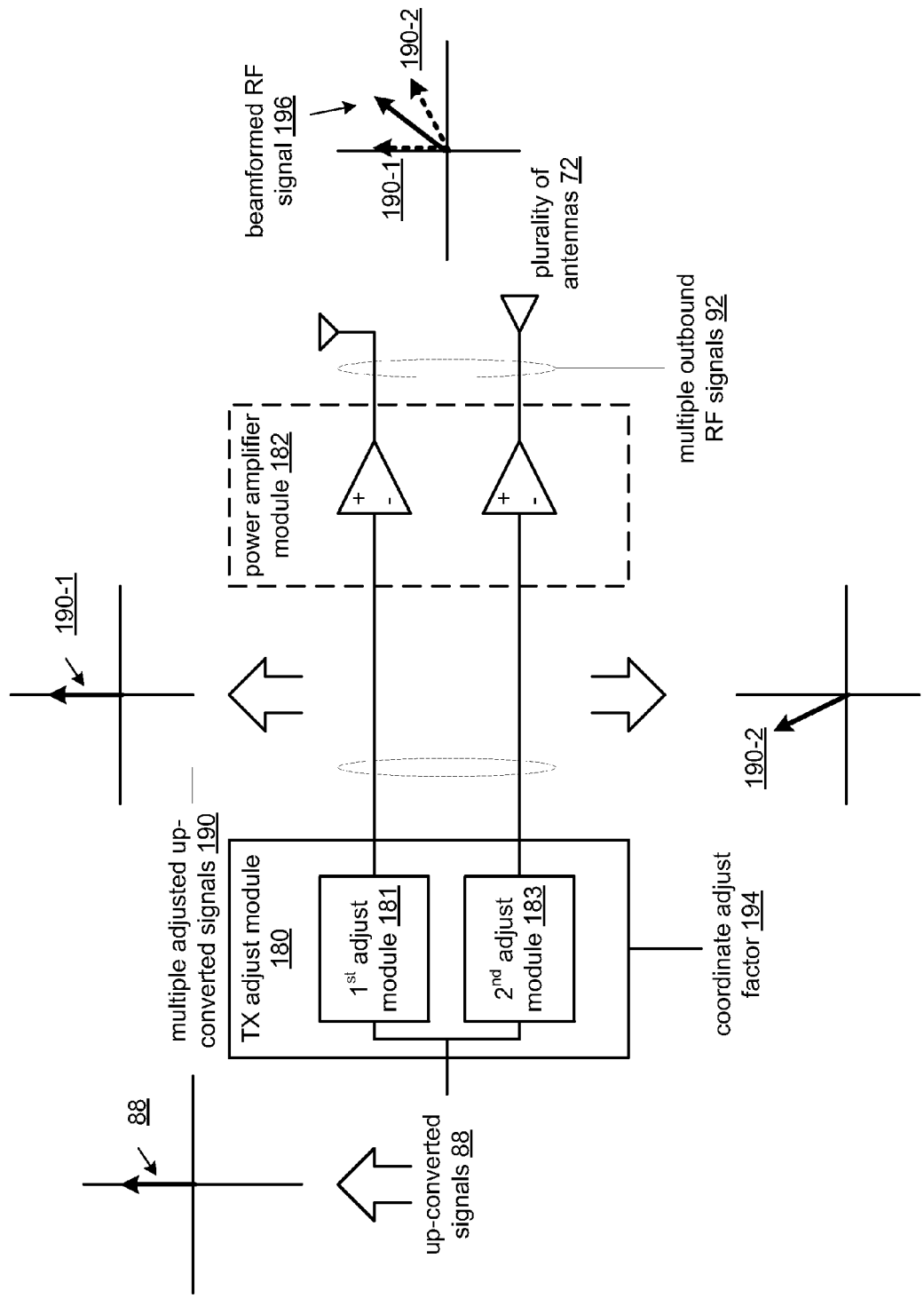
FIG. 9 is a schematic block diagram of another embodiment of a transmit adjust module and a power amplifier module in accordance with the present invention.

FIG. 9 is a schematic block diagram of an embodiment of the transmit adjust module 180 and the power amplifier module 182 when the RF transmitter is in the first transmit mode (e.g., RF beamforming). In this embodiment, the transmit adjust module 180 adjusts the phase and/or amplitude of the up-converted signals 88, via the first and second adjust modules 181 and 183, based on a coordinate adjust factor 194. The coordinate adjust factor 194 is determined based on the number of antennas, the polarization of the antennas, and/or the desired transmission vector. In this example, there are two antennas of the plurality of antennas 72, having different polarizations. The desired transmission vector has an angle of approximately 60°, thus the coordinate adjust factor 194 indicates that two adjusted up-converted signals 190 are to be generated from the up-converted signal 88. The first adjust module 181 generates a $1^{st}$ of the two adjusted up-converted signals 190 with a zero phase adjust and a zero amplitude adjustment of the up-converted signals 88. As such, the $1^{st}$ of the two adjusted up-converted signals 190 is a replica of the up-converted signals 88.

The second adjust module 183 generates a $2^{nd}$ of the two adjusted up-converted signals 190 with a +30° phase adjust and a zero amplitude adjustment of the up-converted signals 88. As such, the $2^{nd}$ of the two adjusted up-converted signals 190 is shown as a vector having the same amplitude as the up-converted signals 88 with a +30° degree phase shift the up-converted signals 88. The power amplifiers of the power amplifier module 182 amplify the two adjusted up-converted signals 190 to produce amplified RF signal components. The power amplifiers may have their gains adjusted in accordance with the coordinate adjust factor 194 to further adjust the corresponding RF signal component. In this example, the gains of the power amplifiers is the same, thus with respect to each other, the magnitudes of the amplified RF signal components is the same.

The antennas 72 transmit the corresponding amplified RF signal components 190-1 and 190-2 to produce a beamformed RF signal 196. The beamforming of the beamformed RF signal 196 is done in air based on a vector summation of the amplified RF signal components 190-1 and 190-2. As shown, when the $2^{nd}$ RF signal component 190-2 is transmitted via an antenna having an orthogonal polarization to the other antenna, the in-air representation of the $2^{nd}$ RF signal component is rotated by 90° with respect to the transmission of the other antenna.

Figure 10:
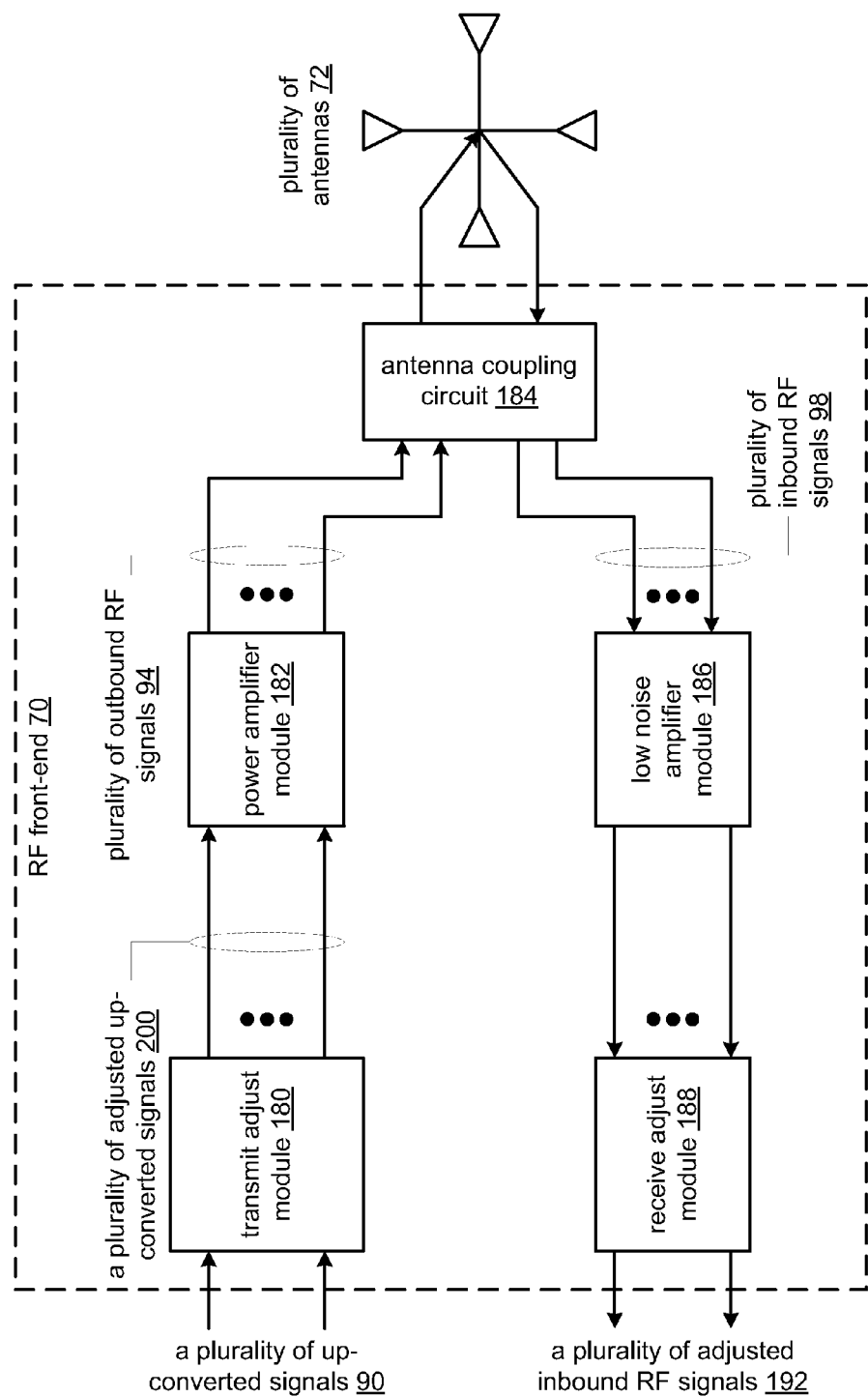
FIG. 10 is a schematic block diagram of another embodiment of an RF front-end in accordance with the present invention.

FIG. 10 is a schematic block diagram of another embodiment of the RF front-end 70 that includes the transmit adjust module 180, the power amplifier module 182, the antenna coupling circuit 184, the low noise amplifier module 186, and the receive adjust module 188. As shown, the RF front-end 70 is coupled to the plurality of antennas 72, which includes four antennas in this example, each having a different polarization.

The transmit adjust module 180 adjusts coordinates of the plurality of up-converted analog signals 90 when the RF transceiver is in the second transmit mode to produce a plurality of adjusted up-converted signals. The power amplifier module 182, which may include one or more power amplifiers, pre-amplifiers, RF bandpass filters, and gain control, amplifies the plurality of adjusted up-converted signals 200 when the RF transceiver is in the second transmit mode to produce a plurality of outbound RF signals 94.

The antenna coupling circuit 184 provides the plurality of outbound RF signals to the at least some of the plurality of antennas 72 when the RF transceiver is in the second transmit mode. The antenna coupling circuit 184 also provides the plurality of inbound RF signals 98 from another at least some of the plurality of antennas 72 to the low noise amplifier module 186 when the RF transceiver is in a second receive mode.

The low noise amplifier module 186, which may include one or more amplifiers, amplifies the plurality of inbound RF signals 98 to produce a plurality of amplified inbound RF signals when the RF transceiver is in the second receive mode. The receive adjust module 188 adjusts coordinates of the plurality of amplified inbound RF signals when the RF transceiver is in the second receive mode to produce a plurality of adjusted inbound RF signals 192. In one embodiment, the transmit adjust module, the power amplifier module, the antenna coupling circuit, the low noise amplifier module, and the receive adjust module located on a common die of an integrated circuit.

Figure 11:
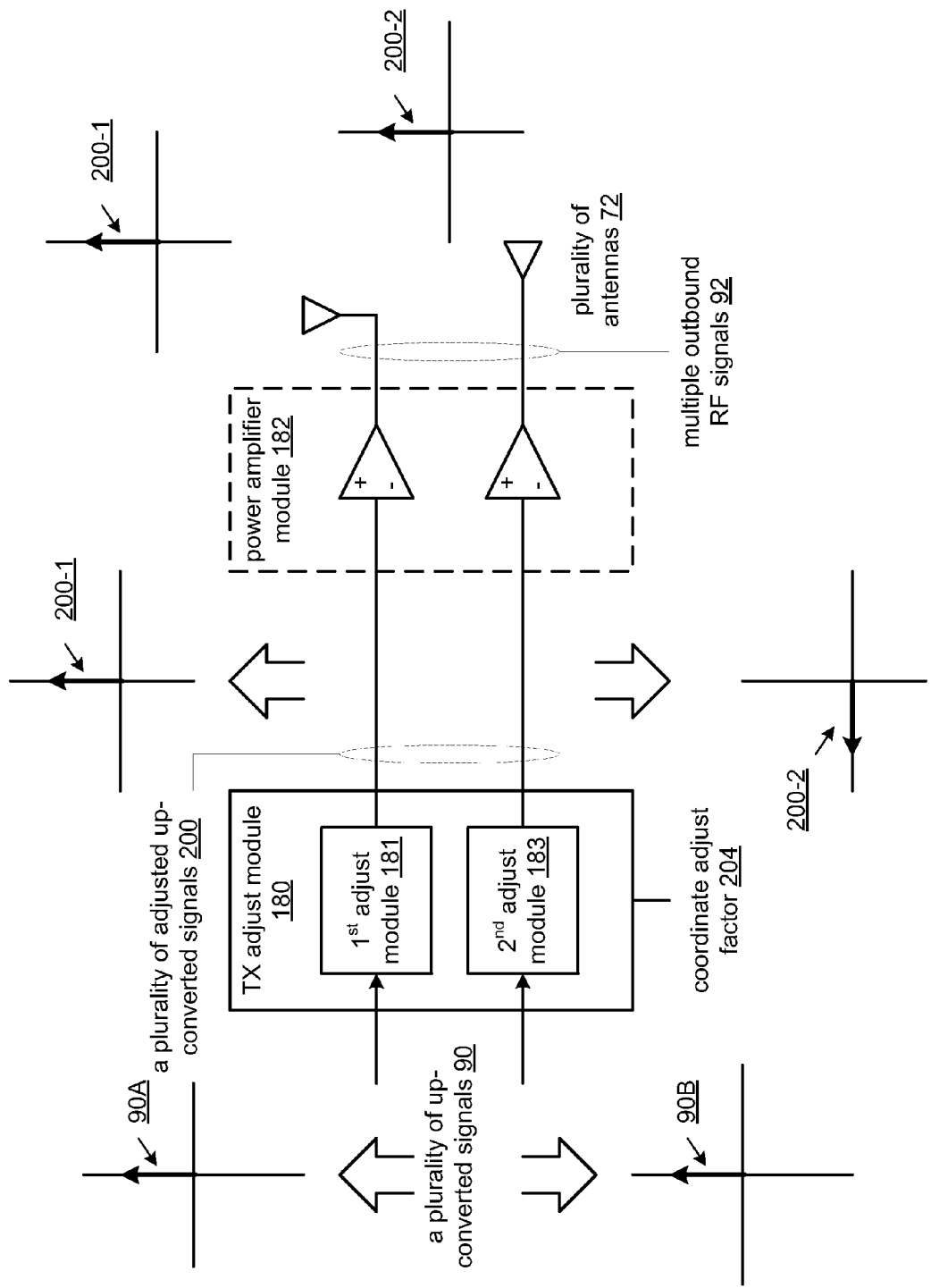
FIG. 11 is a schematic block diagram of another embodiment of a transmit adjust module and a power amplifier module in accordance with the present invention.

FIG. 11 is a schematic block diagram of another embodiment of the transmit adjust module 180 and the power amplifier module 182 when the RF transceiver is in a second mode (e.g., MIMO). As shown, the antennas 72 have orthogonal polarizations. As such, to provide the desired MIMO transmission, one or both of the signals 90A and 90B need to be adjusted.

In this example, the transmit adjust module 180 receives two up-converted signals 90A and 90B that may of the same magnitude and phase, but are separated in space-time or frequency-time. The $1^{st}$ adjust module 181 does not adjust the phase and/or amplitude of the $1^{st}$ up-converted signal 90A in accordance with the coordinate adjust factor 204. The $2^{nd}$ adjust module 183 adjusts the phase by +90° of the $2^{nd}$ up-converted signal 90B in accordance with the coordinate adjust factor 204. The adjusted up-converted signals 200-1 and 200-2 are amplified by the power amplifiers of the power amplifier module 182 and provided to the antennas 72.

The antennas 72 transmit the amplified adjusted up-converted signals 200-1 and 200-2 to produce a MIMO RF transmission. As shown, the $2^{nd}$ amplified adjusted up-converted signals 200-2 is transmitted via an antenna having an orthogonal polarization to the other antenna, the in-air representation of the $2^{nd}$ RF signal component is rotated by 90° with respect to the transmission of the other antenna such that the direction of transmission of both antennas is similar.

Figure 12:
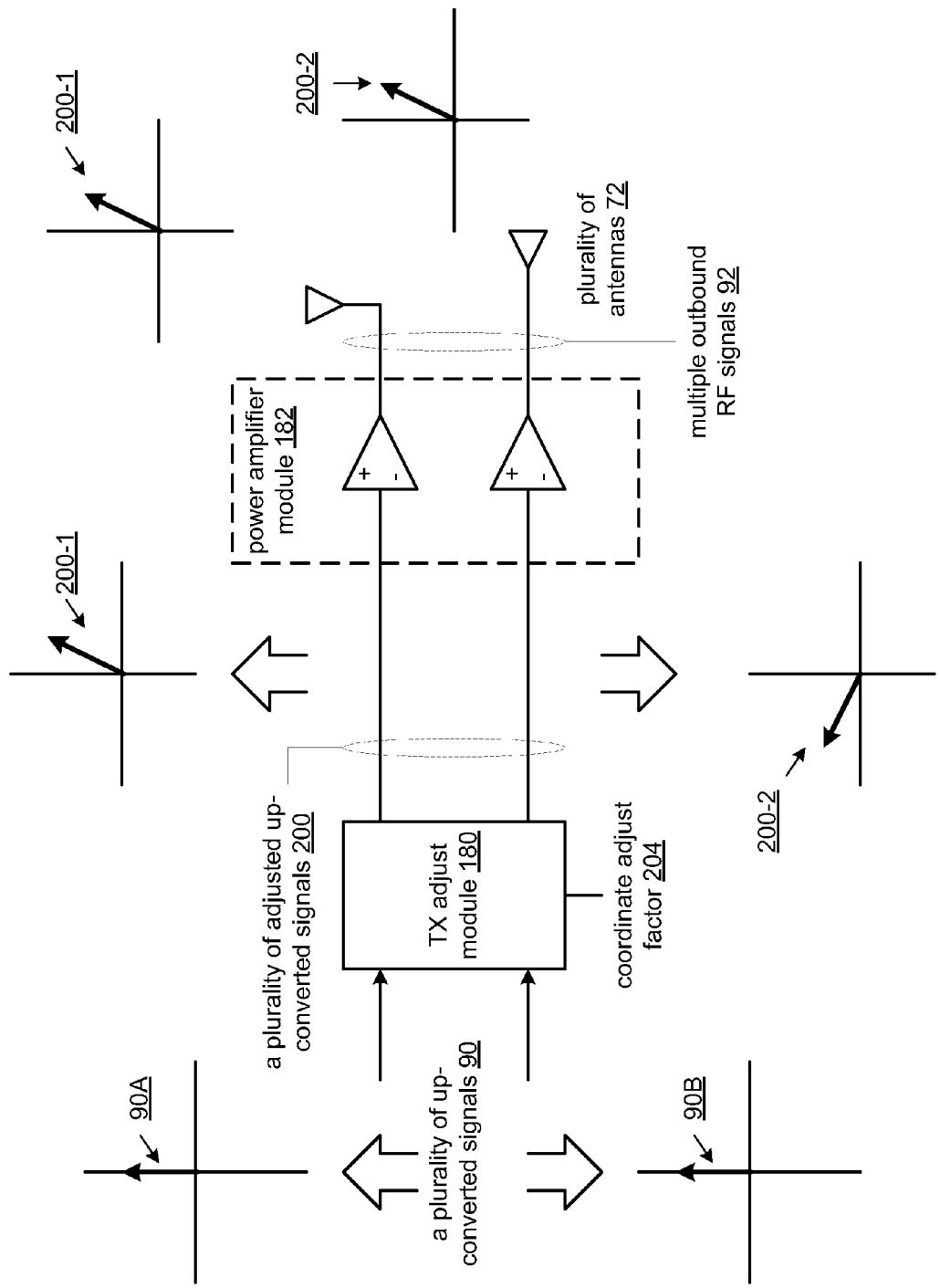
FIG. 12 is a schematic block diagram of another embodiment of a transmit adjust module and a power amplifier module in accordance with the present invention.

FIG. 12 is a schematic block diagram of another embodiment of the transmit adjust module 180 and the power amplifier module 182 when the RF transceiver is in the first and second mode (e.g., RF beamforming and MIMO). As shown, the antennas 72 have orthogonal polarizations. As such, to provide the desired RF beamformed and MIMO transmission, one or both of the signals 90A and 90B need to be adjusted.

In this example, the transmit adjust module 180 receives two up-converted signals 90A and 90B that may of the same magnitude and phase, but are separated in space-time or frequency-time. The $1^{st}$ adjust module 181 adjusts the phase of the $1^{st}$ up-converted signal 90A by −30° in accordance with the coordinate adjust factor 204. The $2^{nd}$ adjust module 183 adjusts the phase of the $2^{nd}$ up-converted signal 90B by +60° in accordance with the coordinate adjust factor 204. The adjusted up-converted signals 200-1 and 200-2 are amplified by the power amplifiers of the power amplifier module 182 and provided to the antennas 72.

The antennas 72 transmit the amplified adjusted up-converted signals 200-1 and 200-2 to produce an RF beamformed and MIMO transmission. As shown, the $2^{nd}$ amplified adjusted up-converted signals 200-2 is transmitted via an antenna having an orthogonal polarization to the other antenna, the in-air representation of the $2^{nd}$ RF signal component is rotated by 90° with respect to the transmission of the other antenna such that the direction of transmission of both antennas is similar (e.g., −30° with respect to the top antenna).

Figure 13:
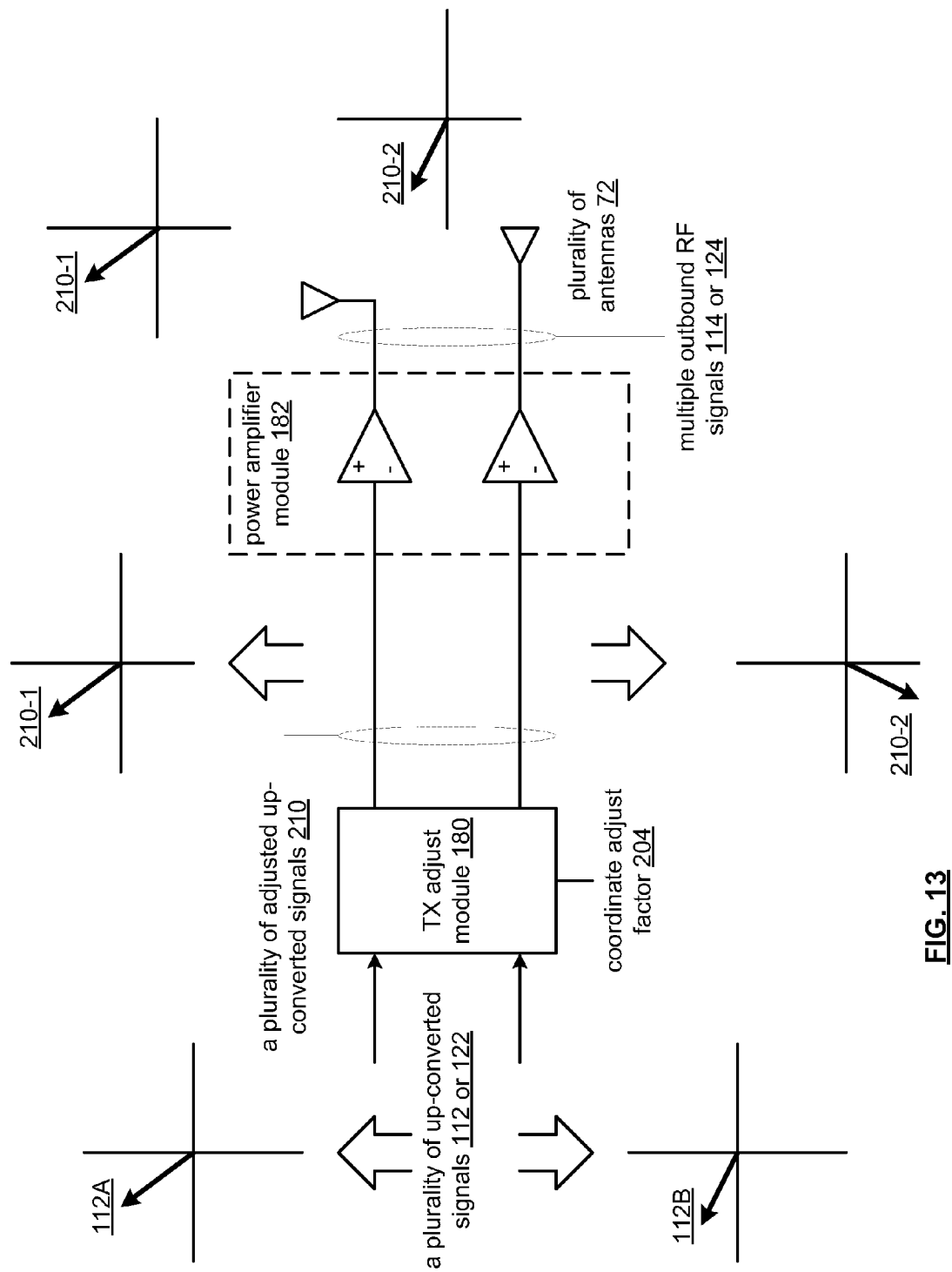
FIG. 13 is a schematic block diagram of another embodiment of a transmit adjust module and a power amplifier module in accordance with the present invention.

FIG. 13 is a schematic block diagram of another embodiment of the transmit adjust module 180 and the power amplifier module 182 when the RF transceiver is in the first and third mode (e.g., RF beamforming and baseband beamforming). As shown, the antennas 72 have orthogonal polarizations. As such, to provide the desired RF beamformed and baseband beamforming transmission, one or both of the signals 112A and 112B need to be adjusted.

In this example, the transmit adjust module 180 receives two up-converted signals 112A and 112B that may of the same magnitude but are of different phase (e.g., −30° and −60°, respectively). The $1^{st}$ adjust module 181 does not adjust the phase of the $1^{st}$ up-converted signal 112A in accordance with the coordinate adjust factor 204. The $2^{nd}$ adjust module 183 adjusts the phase of the $2^{nd}$ up-converted signal 112B by +90° in accordance with the coordinate adjust factor 204. The adjusted up-converted signals 200-1 and 200-2 are amplified by the power amplifiers of the power amplifier module 182 and provided to the antennas 72.

The antennas 72 transmit the amplified adjusted up-converted signals 210-1 and 210-2 to produce an RF and baseband beamformed transmission. As shown, the $2^{nd}$ amplified adjusted up-converted signals 210-2 is transmitted via an antenna having an orthogonal polarization to the other antenna, the in-air representation of the $2^{nd}$ RF signal component is rotated by 90° with respect to the transmission of the other antenna such that the direction of transmission of both antennas is similar to the desired baseband beamforming directions.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A radio frequency (RF) transmitter comprises:
a baseband processing module;
an up conversion module; and
an RF front-end, wherein, when the RF transmitter is in an RF beamforming mode:
   the baseband processing module is operably coupled to:
      convert outbound data into an outbound symbol stream; and
      convert an inbound symbol stream into inbound data;

the up conversion module is operably coupled to convert the outbound symbol stream into an up-converted signal;

the RF front-end is operably coupled to:
  adjust coordinates of the up-converted signal to produce multiple adjusted up-converted signals;
  amplify the multiple adjusted up-converted signals to produce multiple outbound RF signals; and
  transmit the multiple outbound RF signals that combine in-air to produce an outbound beamformed RF signal; and wherein, when the RF transmitter is in a multiple input multiple output (MIMO) mode:
  the baseband processing module is operably coupled to:
    convert the outbound data into a plurality of block encoded streams of outbound symbols; and
    convert a plurality of streams of inbound block encoded symbols into the inbound data;
  the up conversion module is operably coupled to convert the plurality of block encoded streams of outbound symbols into a plurality of up-converted signals;
  the RF front-end is operably coupled to:
    adjust coordinates of the plurality of up-converted analog signals to produce a plurality of adjusted up-converted signals;
    amplify the plurality of adjusted up-converted signals to produce a plurality of outbound RF signals; and
    transmit the plurality of outbound RF signals as an outbound MIMO RF signal.

2. The RF transmitter of claim 1 further comprises, when the RF transmitter is in a baseband beamforming mode:
  the baseband processing module coupled to convert the outbound data into a plurality of beamformed streams of outbound symbols;
  the up-conversion module coupled to convert the plurality of beamformed streams of outbound symbols into a second plurality of up-converted signals;
  the transmit adjust module coupled to adjust coordinates of the second plurality of up-converted analog signals to produce a second plurality of adjusted up-converted signals;
  the power amplifier module coupled to amplify the second plurality of adjusted up-converted signals to produce a second plurality of outbound RF signals.

3. The RF transmitter of claim 1 further comprises, when the RF transmitter is in a baseband beamforming and MIMO mode:
  the baseband processing module coupled to convert the outbound data into a plurality of beamformed and block encoded streams of outbound symbols;
  the up-conversion module coupled to convert the second plurality of beamformed and block encoded streams of outbound symbols into a second plurality of up-converted signals;
  the transmit adjust module coupled to adjust coordinates of the second plurality of up-converted analog signals to produce a second plurality of adjusted up-converted signals; and
  the power amplifier module coupled to amplify the second plurality of adjusted up-converted signals to produce a second plurality of outbound RF signals.

4. The RF transmitter of claim 1, wherein the transmit adjust module comprises:
  a first adjust module coupled to adjust phase angle of the up-converted analog signals based on a first phase angle adjust value to produce one of the multiple adjusted up-converted signals; and
  a second adjust module coupled to adjust phase angle of the up-converted analog signals based on a second phase angle adjust value to produce a second one of the multiple adjusted up-converted signals, wherein at least some of a plurality of antennas have a substantially similar polarization.

5. The RF transmitter of claim 1, wherein the transmit adjust module comprises:
  a first adjust module coupled to adjust phase angle of a first one of the plurality of up-converted analog signals based on a first phase angle adjust value to produce one of the plurality of adjusted up-converted signals; and
  a second adjust module coupled to adjust phase angle of a second one of the plurality of up-converted analog signals based on a second phase angle adjust value to produce a second one of the plurality of adjusted up-converted signals, wherein at least some of a plurality of antennas have a substantially similar polarization.

6. The RF transmitter of claim 1, wherein the transmit adjust module comprises:
  a first adjust module coupled to adjust phase angle of the up-converted analog signals based on a first phase angle adjust value to produce one of the multiple adjusted up-converted signals; and
  a second adjust module coupled to adjust phase angle of the up-converted analog signals based on a second phase angle adjust value to produce a second one of the multiple adjusted up-converted signals, wherein at least some of a plurality of antennas have a different polarization.

7. The RF transmitter of claim 1, wherein the transmit adjust module comprises:
  a first adjust module coupled to adjust phase angle of a first one of the plurality of up-converted analog signals based on a first phase angle adjust value to produce one of the plurality of adjusted up-converted signals; and
  a second adjust module coupled to adjust phase angle of a second one of the plurality of up-converted analog signals based on a second phase angle adjust value to produce a second one of the plurality of adjusted up-converted signals, wherein at least some of a plurality of antennas have a different polarization.

8. The RF transmitter of claim 1 further comprises:
  the up-conversion module and the RF front-end located on a common die of an integrated circuit.

9. A radio frequency (RF) front-end comprises:
  a transmit adjust module coupled to adjust coordinates of an up-converted analog signal when in a first transmit mode to produce multiple adjusted up-converted signals and to adjust coordinates of a plurality of up-converted analog signals when in a second transmit mode to produce a plurality of adjusted up-converted signals;
  a power amplifier module coupled to amplify the multiple adjusted up-converted signals when in the first transmit mode to produce multiple outbound RF signals and to amplify the plurality of adjusted up-converted signals when in the second transmit mode to produce a plurality of outbound RF signals;
  antenna coupling circuit operable to:
    provide the multiple outbound RF signals to two or more of a plurality of antennas when in the first transmit mode;
    provide the plurality of outbound RF signals to the two or more of the plurality of antennas when in the second transmit mode;

provide multiple inbound RF signals from the two or more of the plurality of antennas to a low noise amplifier module when in a first receive mode; and provide a plurality of inbound RF signals from the two or more of the plurality of antennas to the low noise amplifier module when in a second receive mode;

a low noise amplifier module coupled to amplify the multiple inbound RF signals to produce multiple amplified inbound RF signals when in the first receive mode and to amplify the plurality of inbound RF signals to produce a plurality of amplified inbound RF signals when in the second receive mode; and a receive adjust module coupled to adjust coordinates of the multiple amplified inbound RF signals when in the first receive mode to produce adjusted inbound RF signals and to adjust coordinates of the plurality of amplified inbound RF signals when in the second receive mode to produce a plurality of adjusted inbound RF signals.

10. The RF front-end of claim 9, wherein the transmit adjust module comprises:

a first adjust module coupled to adjust phase angle of the up-converted analog signals based on a first phase angle adjust value to produce one of the multiple adjusted up-converted signals;

a second adjust module coupled to adjust phase angle of the up-converted analog signals based on a second phase angle adjust value to produce a second one of the multiple adjusted up-converted signals, wherein the at least some of the plurality of antennas have a substantially similar polarization.

11. The RF front-end of claim 9, wherein the transmit adjust module comprises:

a first adjust module coupled to adjust phase angle of a first one of the plurality of up-converted analog signals based on a first phase angle adjust value to produce one of the plurality of adjusted up-converted signals;

a second adjust module coupled to adjust phase angle of a second one of the plurality of up-converted analog signals based on a second phase angle adjust value to produce a second one of the plurality of adjusted up-converted signals, wherein the at least some of the plurality of antennas have a substantially similar polarization.

12. The RF front-end of claim 9, wherein the transmit adjust module comprises:

a first adjust module coupled to adjust phase angle of the up-converted analog signals based on a first phase angle adjust value to produce one of the multiple adjusted up-converted signals;

a second adjust module coupled to adjust phase angle of the up-converted analog signals based on a second phase angle adjust value to produce a second one of the multiple adjusted up-converted signals, wherein the at least some of the plurality of antennas have a different polarization.

13. The RF front-end of claim 9, wherein the transmit adjust module comprises:

a first adjust module coupled to adjust phase angle of a first one of the plurality of up-converted analog signals based on a first phase angle adjust value to produce one of the plurality of adjusted up-converted signals;

a second adjust module coupled to adjust phase angle of a second one of the plurality of up-converted analog signals based on a second phase angle adjust value to produce a second one of the plurality of adjusted up-converted signals, wherein the at least some of the plurality of antennas have a different polarization.

14. The RF front-end of claim 9 further comprises:

the plurality of antennas, wherein the at least some of the plurality of antennas are transmit antennas of the plurality of antennas and the another at least some of the plurality of antennas are receive antennas.

15. The RF front-end of claim 9 further comprises:

the plurality of antennas, wherein, when in the first or second transmit mode, the plurality of antennas constitutes the at least some of the plurality of antennas and, when in the first or second receive mode, the plurality of antennas constitutes the another at least some of the plurality of antennas.

16. The RF front-end of claim 9 further comprises:

the transmit adjust module, the power amplifier module, the antenna coupling circuit, the low noise amplifier module, and the receive adjust module located on a common die of an integrated circuit.

* * * * *